United States Patent
Gupta et al.

(10) Patent No.: US 10,699,668 B1
(45) Date of Patent: Jun. 30, 2020

(54) CONFIGURABLE VIDEO REDIRECTION IN A DATA CENTER

(71) Applicant: Dell Products, L.P., Round Rock, TX (US)

(72) Inventors: Chitrak Gupta, Bangalore (IN); Rama Rao Bisa, Bangalore (IN); Rajeshkumar Ichchhubhai Patel, Bangalore (IN); Sushma Basavarajaiah, Bangalore (IN); Elie Antoun Jreij, Pflugerville, TX (US); Jitendra Kumar, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/296,915

(22) Filed: Mar. 8, 2019

(51) Int. Cl.
*G09G 5/00* (2006.01)
*H04N 21/44* (2011.01)
*H04L 29/06* (2006.01)

(52) U.S. Cl.
CPC ....... *G09G 5/006* (2013.01); *H04L 29/06312* (2013.01); *H04L 29/06517* (2013.01); *H04N 21/44004* (2013.01); *G09G 2360/12* (2013.01); *G09G 2360/18* (2013.01)

(58) Field of Classification Search
CPC ........ H04N 21/44004; H04L 29/06312; H04L 29/06517; G09G 5/006; G09G 2360/12; G09G 2360/18
See application file for complete search history.

(56) References Cited

U.S. PATENT DOCUMENTS

| | | | | |
|---|---|---|---|---|
| 2008/0021978 | A1* | 1/2008 | Maynard | H04L 41/00 709/217 |
| 2008/0069206 | A1* | 3/2008 | Yang | H04N 7/17318 375/240.01 |
| 2011/0276625 | A1* | 11/2011 | Shah | H04L 41/0273 709/203 |
| 2013/0159546 | A1* | 6/2013 | Thang | H04L 65/4084 709/231 |
| 2015/0049093 | A1* | 2/2015 | Doll | G06T 13/80 345/473 |
| 2017/0315951 | A1* | 11/2017 | Tung | G06F 13/4081 |

* cited by examiner

*Primary Examiner* — Jacinta M Crawford
(74) *Attorney, Agent, or Firm* — Fogarty LLP

(57) ABSTRACT

Embodiments of systems and methods for providing configurable video redirection in a data center are discussed. In an embodiment, an Information Handling System (IHS) may include a Baseband Management Controller (BMC); and a memory coupled to the BMC, the memory having program instructions stored thereon that, upon execution by the BMC, cause the BMC to: receive a request from a remote client, where the request follows a first protocol; select one of a plurality of redirection components available to the IHS to populate a framebuffer with video frames using a second protocol; retrieve the video frames from the framebuffer; and transmit a response to the remote client following the first protocol, where the response comprises the video frames.

20 Claims, 10 Drawing Sheets

CONFIGURABLE VIDEO REDIRECTION IN A DATA CENTER

FIELD

The present disclosure generally relates to Information Handling Systems (IHSs), and, more particularly, to systems and methods for providing configurable video redirection in a data center.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In various situations, a client IHS may control a target IHS via a network (e.g., the Internet) using remote desktop software. The client IHS captures mouse and keyboard inputs from a user (the user is local with respect to the client IHS) and sends those inputs to a target IHS at a remote location. Keystrokes and mouse clicks are registered by the target IHS as if they had been received locally, and the target IHS redirects its video output (e.g., desktop graphics) and/or commands to the client IHS.

SUMMARY

Embodiments of systems and methods for providing configurable video redirection in a data center. In an illustrative, non-limiting embodiment, an Information Handling System (IHS) may include a Baseband Management Controller (BMC); and a memory coupled to the BMC, the memory having program instructions stored thereon that, upon execution by the BMC, cause the BMC to: receive a request from a remote client, where the request follows a first protocol; select one of a plurality of redirection components available to the IHS to populate a framebuffer with video frames using a second protocol; retrieve the video frames from the framebuffer; and transmit a response to the remote client following the first protocol, where the response comprises the video frames.

For example, request may include a request for access to (i) a display output and (ii) a Human Interface Device (HID) of the IHS. The HID may include at least one of: a keyboard or a mouse. The first and second protocols may be selected from the group consisting of: Remote Desktop Protocol (RDP), Virtual Network Computing (VNC), Dynamic Virtual Channel (DVC), Serial-Over-Local-Area-Network (SOL), and virtual Keyboard Video and Mouse (vKVM). The framebuffer may include a circular framebuffer with pre-captured video frames, and the video frames in the response may be captured prior to the request being received.

In some cases, prior to selecting the redirection component, the program instructions, upon execution by the BMC, may cause the BMC to inventory each redirection component available to the IHS. To inventory each redirection component, the program instructions, upon execution by the BMC, may cause the BMC to check a status of a software license of each redirection component. Additionally, or alternatively, to inventory each redirection component, the program instructions, upon execution by the BMC, further cause the BMC to collect information about a frame rate of a video stream provided by each redirection component.

The request may include a maximum or minimum bandwidth requirement, and to select the redirection component, the program instructions, upon execution by the BMC, may cause the BMC to select a redirection component meeting the bandwidth requirement. The request may also comprise a maximum or minimum pixel resolution requirement, and to select the redirection component, the program instructions, upon execution by the BMC, may cause the BMC to select a redirection component meeting the resolution requirement.

In another illustrative, non-limiting embodiment, a hardware memory of an IHS may have program instructions stored thereon that, upon execution by a Chassis Management Controller (CMC), cause the CMC to: receive a request from a remote client to access a selected one of a plurality of IHS blades managed by the CMC, where the request follows a first protocol; select one of a plurality of redirection components available to the selected IHS blade to populate a framebuffer with video frames received from the selected IHS blade using a second protocol; retrieve the video frames from the framebuffer; and transmit a response to the remote client following the first protocol, where the response comprises the video frames.

The request may include a request for access to a display desktop of the selected IHS blade. Prior to selecting the redirection component, the program instructions, upon execution by the CMC, may cause the CMC to inventory each redirection component available to the selected IHS blade by verifying the validity or suitability of at least one of: a status of a software license, a pixel resolution, or a frame rate provided by each redirection component.

The framebuffer may be a circular framebuffer with pre-captured video frames, and the video frames in the response may be captured prior to the request being received. In some cases, the request may include comprises a bandwidth and a pixel resolution requirement, and to select the redirection component, the program instructions, upon execution by the CMC, may cause the CMC to select a redirection component meeting the bandwidth and the pixel resolution requirements.

In yet another illustrative, non-limiting embodiment, a method may include receiving a request from a remote client to access a selected one of a plurality of IHS blades managed by a Top-of-Rack (ToR) switch, wherein the request follows a first protocol; selecting, by the ToR switch, one of a plurality of redirection components available to the selected IHS blade to populate a framebuffer with video frames received from the selected IHS blade using a second protocol; retrieving, by the ToR switch, the video frames from the framebuffer; and transmitting, by the ToR switch, a response to the remote client following the first protocol, where the response comprises the video frames.

Prior to selecting the redirection component, the method may include inventorying each redirection component available to the selected IHS blade, where inventorying each redirection component comprises validating, by the ToR switch, a software license provided by at least one of the redirection components. The framebuffer may be a circular framebuffer with pre-captured video frames, and the video frames in the response are captured prior to the request being received.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
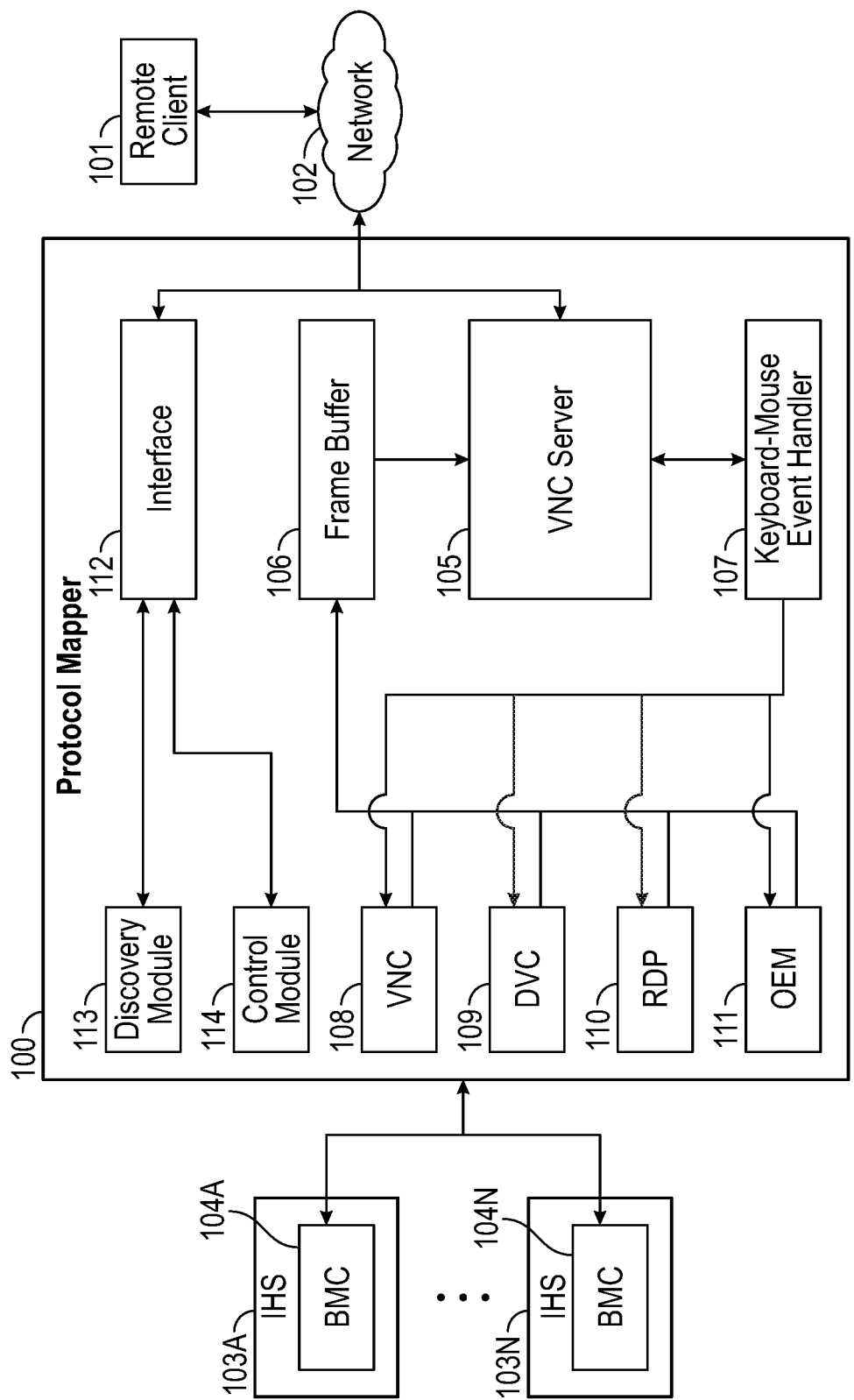
FIG. 1A is a diagram illustrating an example of a protocol mapper, according to some embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

In various embodiments, systems and methods described herein enable management of remotely deployed IHSs using a protocol mapper executed by IHS components such as Baseband Management Controllers (BMCs), Chassis Management Controllers (CMCs), and/or Top-of-Rack (ToR) switches. Particularly, these IHS components may be configured to: (i) receive keyboard and mouse inputs from a user operating a client IHS during a video redirection session (e.g., desktop sharing), and transmit those inputs to a target IHS that is remotely located with respect to both the client IHS and the user; and (ii) support a number of different video redirection technologies to transmit graphics produced by the target IHS to the client IHS during the video redirection session.

With respect to video redirection technologies, virtual Keyboard, Video, and Mouse (vKVM) is a software application that enables video, keyboard, and mouse redirection in BMCs and other service processors. To use vKVM, a client IHS installs browser plugins (e.g., "Active X" or "Java") or uses Hypertext Markup Language (HTML) web sockets, to access the video output of a target IHS over a network. Protocols that support vKVM include, but are not limited to, Dambrackas Video Compression (DVC), American Megatrend's (AMI's) Advanced Adaptive Video Compression Algorithm (AAVICA), etc.

Another example of a video redirection technology in use today is Virtual Network Computing (VNC), which uses the Remote Framebuffer protocol (RFB). A VNC client transmits keyboard and mouse events from the client IHS to the target IHS, relaying graphical screen updates back in the other direction, over a network. Yet other video redirection technologies include the Remote Desktop Protocol (RDP) and other proprietary and Original Equipment Manufacturer (OEM) protocols (e.g., such as Integrated Lights-Out or "iLO", etc.).

In various embodiments described herein, a protocol mapper may be implemented in a BMC, CMC, and/or ToR switch, for example, that redirect multiple protocols (e.g., DVC, RFB, etc.) from different target IHS servers, sleds, or blades, to a remotely located client IHS over a network. In some cases, by providing a video output in a single, unified format, the protocol mapper may reduce the burden otherwise involved in supporting different software clients for each different video redirection technology.

In some cases, an interface may be provided to enable selection of a particular protocol, for the video output, based upon a status of a software license. For example, a license status may indicate whether a given redirection component is licensed or not licensed and/or it may include a list of enable features for the given component (e.g., fewer than all installed features may be made available, depending upon the licensing level). In other cases, the selection of a video redirection protocol may be based upon bandwidth, pixel resolution, and/or frame rate requirements.

FIG. 1A is a diagram illustrating an example of protocol mapper 100. In some implementations, protocol mapper 100 may be used to provide vKVM access to remote client, console, or aggregators. Particularly, protocol mapper 100 may be implemented as an RFB-based KVM engine executed by a BMC, CMC, ToR switch, etc., to unify KVM access of one or more of target IHSs 103A-N by remote client IHS 101.

Client IHS 101 accesses any of target IHSs 103A-N using protocol mapper 100 over network 102. In some implementations, protocol mapper 100 may be executed by BMCs 104A-N within each corresponding one of IHSs 103A-N, as in FIG. 2. In other implementations, protocol mapper 100 may be executed by CMC 301 or ToR switch 401 switch coupled to target IHSs 103A-N, as in FIGS. 3 and 4, respectively. In the latter case, target IHS 103 may be provided in the form of a server blade in a chassis (e.g., in a data center). More generally, however, protocol mapper 100 may be executed by any client IHS 101 with redirection access to any target IHS 103.

During a video redirection session, client IHS 101 requests video redirection, desktop sharing, and/or KVM access and control from a selected one of target IHSs 103A-N coupled to VNC server 105. VNC server 105 retrieves graphics, video, or image frames stored in framebuffer 106.

The graphics, video, or image frames retrieved by VNC server 105 have been stored in framebuffer 106 by one or more of video redirection component(s) or plug-in(s): VNC component 108, DVC component 109, RDP component 110, and/or OEM/proprietary component 111 (e.g., "iLO"). As such, the contents of framebuffer 106 are representative of the state of the local video output being produced by a selected one or more of target IHSs 103A-N.

As used herein, the term "framebuffer" refers to a portion of memory containing a bitmap that drives a video display— that is, is a memory buffer containing at least one complete frame of data. The information in framebuffer 106 may include color values for every pixel to be shown on the display of a target IHS 103 (to be redirected to client IHS 101). Color values are commonly stored in any suitable number of bits. In some cases, an alpha channel may provide additional information about pixel transparency. The amount of memory required for framebuffer 106 depends upon the resolution of the video frames as well as on color depth and/or palette. In many implementations, a software framebuffer may emulate the operation of a hardware framebuffer (e.g., the Linux framebuffer device or "fbdev," and the X Virtual Framebuffer "Xvfb") by abstracting the physical method for accessing the underlying device into a memory map.

The request issued by client IHS 101 may be a request for access to display output and/or Human Interface Devices (HIDs), such as keyboard/mouse port(s) of target IHS 103. The request may follow the VNC protocol and it may be processed by VNC server using unified interface 112. Unified interface 112 may be implemented, for example, using a Web Services for Management (WS-Management) platform and/or the Redfish specification, API, and schema to specify a Representational State Transfer (REST)ful interface using JavaScript Object Notation (JSON) and Open Data Protocol (OData).

In some cases, various parameters for the video redirection session may be handled via unified interface 112 including, but not limited to: (i) a target IHS; (ii) a selected protocol or a list of protocols to be used order by of priority or preference; (iii) a minimum, maximum and/or range of bandwidth(s) for the video output (e.g., Kb/s); (iv) a minimum, maximum, or range of pixel resolution(s) (e.g., VGA or SVGA); (v) a minimum, maximum, or range of frame rates (e.g., 20-30 fps); (vi) software license verification information (e.g., user credentials, etc.); and/or other parameters.

Prior to selecting one or more redirection component(s) 108-111 to be used in the session, discovery module 113 may inventory each of redirection components 108-111 available to target IHS 103. For example, discovery module 113 may issue discovery commands to each of IHSs 103A-N, and it may store responses indicating the availability of a given protocol and its parameters to that IHS in a look-up table (LUT) or the like. In some cases, subsequent discovery requests may be issued upon a user's command and/or periodically to maintain the LUT updated.

Referring back to the request received from client 101, unified interface 112 may send the request's parameters to control module 114, which then selects one or more redirection components 108-111 to populate framebuffer 106 based, at least in part, on the received parameters and the discovery information. Control module 114 may include its own LUTs and/or rules usable to select a particular redirection component using those parameters. In many cases, control module 114 may use protocol(s) that is/are different from the VNC protocol of the original request (e.g., an OEM protocol).

For example, control module 114 may select a video redirection protocol based upon one or more of: a status of a software license of each redirection component, a pixel resolution of a video frame provided by each redirection component, a frame rate of a video stream provided by each redirection component, and/or a bandwidth requirement. In some cases, for the same target IHS, control module 114 may cause two or more video redirection protocols to populate framebuffer 106 concurrently and with different parameters (e.g., different pixel resolutions, etc.).

Then, VNC server 105 may retrieve the contents of framebuffer 106 (e.g., video frames) and it may transmit those contents to client IHS 103 using the VNC protocol (i.e., using the same protocol as the original request) for local rendering of a remote display being produced by the target IHS's desktop during the session. During that session, VNC server 105 receives and transmits keyboard-mouse events using handler 107 to communicate HID inputs from client 101 to target IHS 103 as if those inputs were local to target IHS 103. In some cases, framebuffer 106 may be updated by target IHS 103 based upon inputs received by handler 107.

Still during the session, client IHS 101 may issue other commands to control the state of target IHS 103. Those commands may be received and/or processed by control module 114. For example, control module 114 may include an Application Programming Interface (API) for power control (e.g., ON, OFF, Reset, non-maskable interrupt or "NMI") of target IHS 103 via unified interface 112.

Figure 1B:
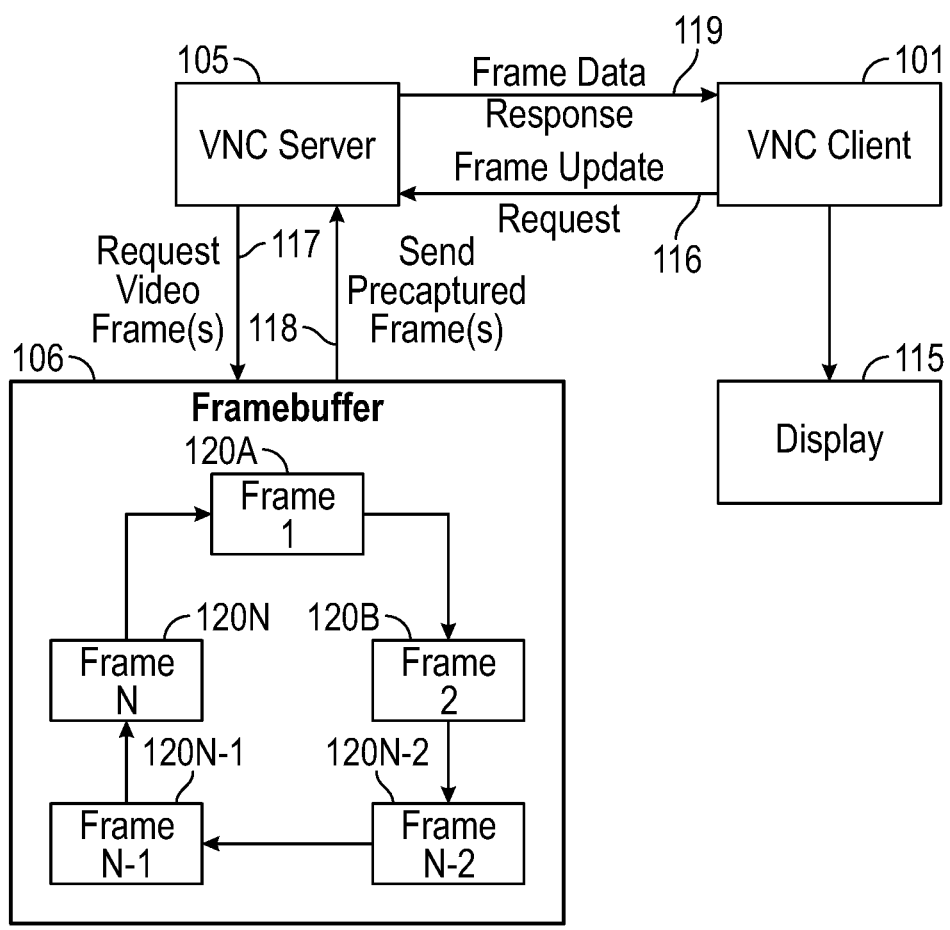
FIG. 1B is a diagram illustrating an example of a circular buffer with pre-captured video frames, according to some embodiments.

FIG. 1B is a diagram illustrating an example of a circular framebuffer 106 with pre-captured video frames 120A-N. In this implementation, VNC client 101 may display KVM video frames collected from target IHS 103 locally, via display device 115. Generally, the video performance of KVM is expected to be close to the performance of a local display device, which depends upon VNC client 101's frame update frequency.

VNC is a pull model, such that VNC client 101 pulls the frame update from VNC server 105. VNC client 101 sends update request 116 to VNC server 105 as soon as the previous frame data is processed. In a conventional framebuffer, a process bottleneck would result in connection with the capture-compare-decode operations performed on the VNC server 105's side because, ordinarily, it is only after VNC server 105 receives update request 116 from client 101 that initiates the operations required to capture the frame differences (in encoded form), and sends it back to client 101. As such, the conventional process takes time, which impacts the performance in terms of FPS (frames per second). And, at higher resolution and with larger screen updates, the FPS degrades even more, which can result in sluggish mouse movements, slower video update on display 115.

To address these, and other problems, framebuffer 106 may be implemented as a circular or cyclic memory such that video frames 120A-N from target IHS 103 are captured, compared, decoded, and stored in the absence or anticipation of request 116. When VNC server 105 receives a VNC connection from client 101, it proactively initiates a capture-compare-decode engine that improves the frame update performance.

The captured frame data 120A-N is kept in the circular buffer and made ready to send. Once VNC server 105 receives frame update request 116 from VNC client 101, it requests 117, receives 118, and re-transmits 119 one or more of its oldest frame(s) (e.g., 120N) to VNC client 101. VNC server 105 continues to capture next frame in the background, keeps it in circular framebuffer 106, and makes it ready for subsequent update request(s). All subsequent update requests 116-117 are served 118-119 immediately as the next frame data (e.g., 120A) is readily available, without VNC client 101 having to wait for a response to each and every update request.

Figure 2:
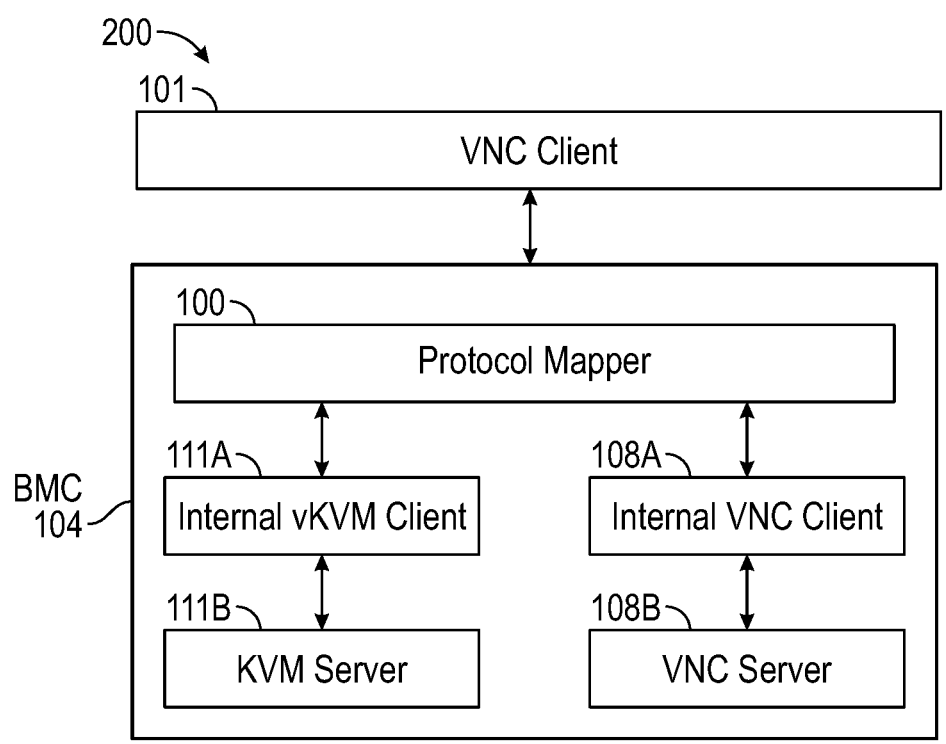
FIG. 2 is a diagram illustrating a protocol mapper implemented in a Baseband Management Controller (BMC), according to some embodiments.

FIG. 2 is a diagram illustrating protocol mapper 100 implemented in BMC 104. In this example, VNC client 101 sends a video redirection request to protocol mapper 100 executed by BMC 104 within target IHS 103. Protocol mapper 100 is an intermediate server or service configured to produce a request for a supported protocol and to answer the request with supported protocol blocks.

For example, if VNC component 108 is selected, protocol mapper 100 may produce internal VNC client 108A and server 108B to receive frame data with which to populate framebuffer 106. Alternatively, if vKVM component 111 is selected, protocol mapper 100 may produce vKVM client 111A and server 111B to receive frame data with which to populate framebuffer 106.

Figure 3:
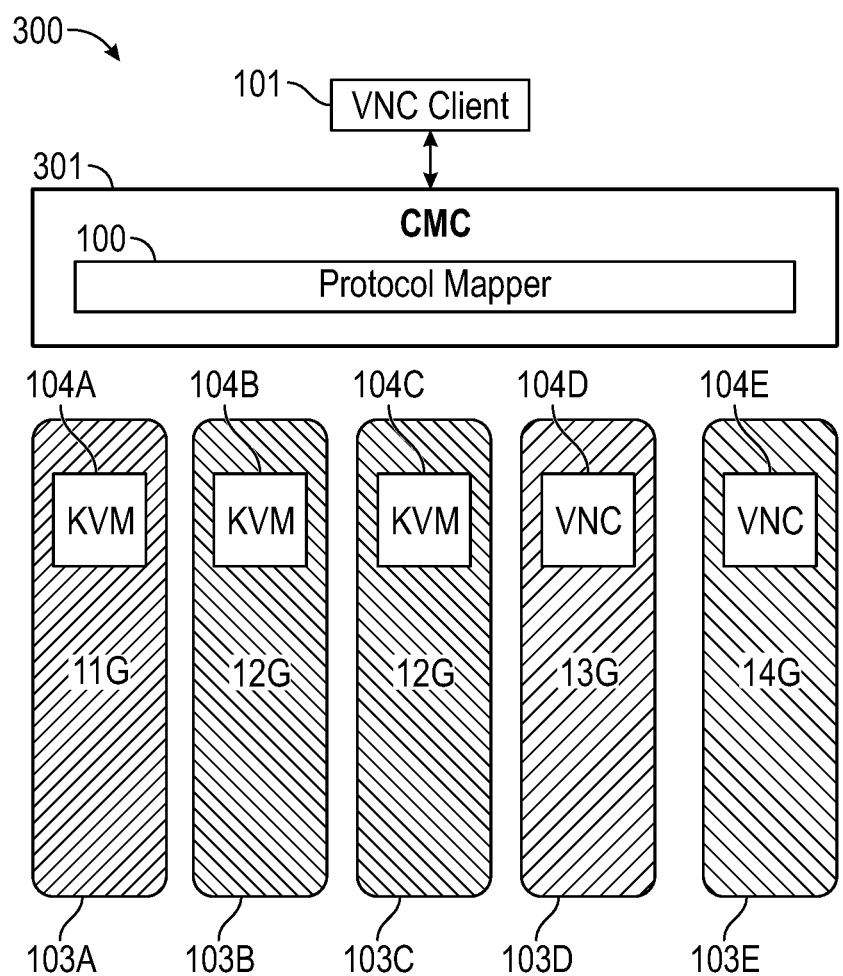
FIG. 3 is a diagram illustrating a protocol mapper implemented in a Chassis Management Controller (CMC) or enclosure controller, according to some embodiments.

FIG. 3 is a diagram illustrating protocol mapper 100 implemented in CMC 301 (or an enclosure controller). In some cases, CMC 301 may include embedded system management hardware and/or software configured to manage multiple servers, networking, and/or storage. CMC 301 may include a secure browser-based interface that enables an administrator to take inventory, perform configuration and monitoring tasks, remotely power on/off blade servers and enable alerts for events on servers and components in the blade chassis. CMC 301 may include a processor and memory and dedicated internal network device.

In some implementations, CMC 301 may be configured to perform multi-chassis management. CMC 301 may also include an interface with each blade or server node's BMC 104 module, to enable server-specific BMC operations such as performing updates, changing settings, or opening a remote console or video redirection session, etc. Moreover, CMC 301 may be configured to assign video redirection settings to an empty slot in the chassis, so that those settings will be applied when a blade is inserted in the future.

In a chassis infrastructure, CMC 301 may host protocol mapper 100 which aggregates vKVM protocol components 104A-C from hosted blades 103A-C in the chassis, respectively. Additionally, or alternatively, protocol mapper 100 may aggregate VNC protocols 104D and 104E from hosted blades 103D and 103E.

Figure 4:
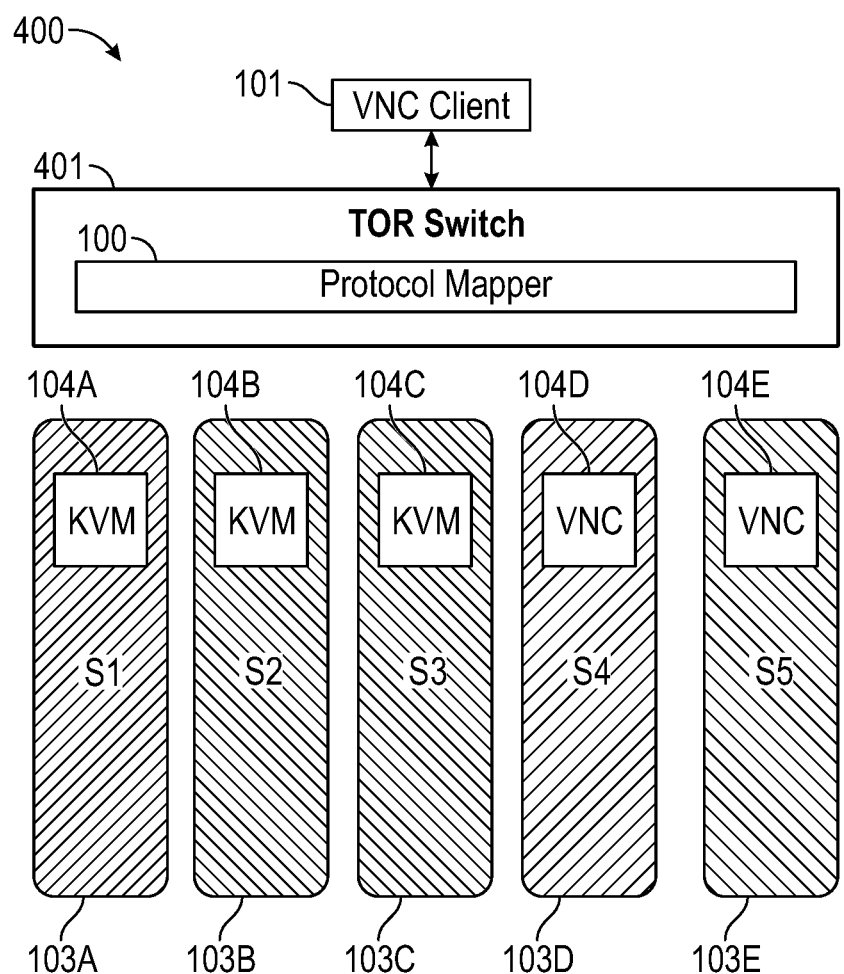
FIG. 4 is a diagram illustrating a protocol mapper implemented in a Top-of-Rack (ToR) switch, according to some embodiments.

FIG. 4 is a diagram illustrating protocol mapper 100 implemented in ToR switch 401. In some cases, ToR switch 401 may implement any switch located or installed inside a rack and/or in a heterogeneous environment, which in turn enables servers to connect to an Ethernet device or the like. ToR switch 401 is usually placed at the top of the server rack. More generally, however, ToR switch 401 may be placed anywhere inside a rack and connected to aggregation switches via fiber optic cables or the like.

In a rack, ToR switch 401 may host protocol mapper 100 which aggregates vKVM protocol components 104A-C from hosted blades 103A-C in the rack, respectively. Additionally, or alternatively, protocol mapper 100 may aggregate VNC protocols 104D and 104E from hosted blades 103D and 103E, respectively.

Figure 5:
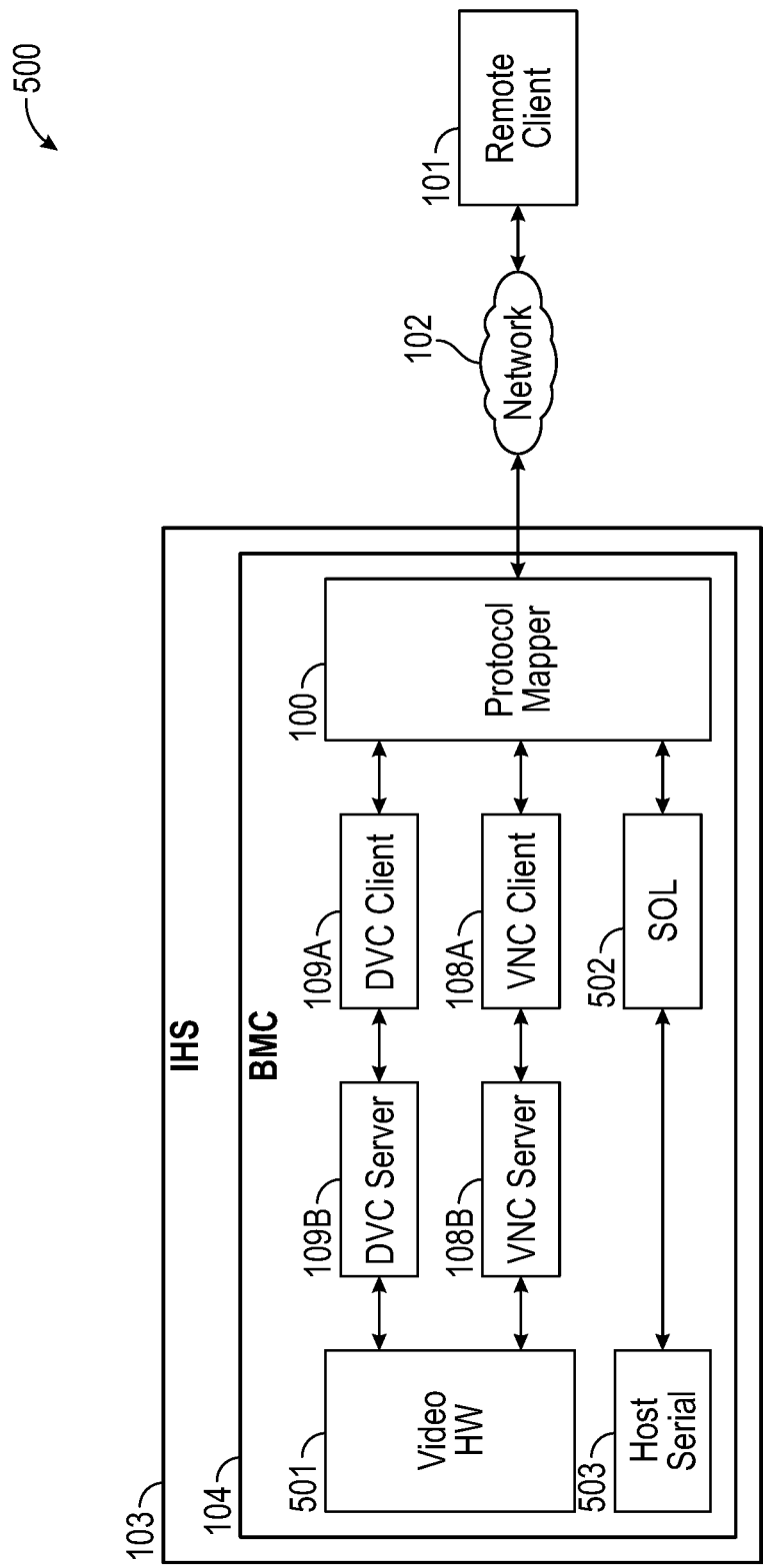
FIG. 5 is a diagram illustrating protocol mapping operations performed by a BMC, according to some embodiments.

FIG. 5 is a diagram illustrating protocol mapping operations performed by BMC 104. In some embodiments, upon receiving a video redirection request from client IHS 101 over network 102, protocol mapper 100 of BMC 104 in target IHS 103 selects a DVC 109 or VNC 108 protocol for retrieving video signals from video hardware 501.

To populate framebuffer 106 with data from video hardware 501, CMC 301 instantiates DVC client 109A and DVC server 109B and/or VNC client 108A and VNC server 108B, as applicable. Additionally, or alternatively, protocol mapper 502 may use Serial Over LAN (SOL) mechanism 502 to retrieve video signals via serial port 503.

Figure 6:
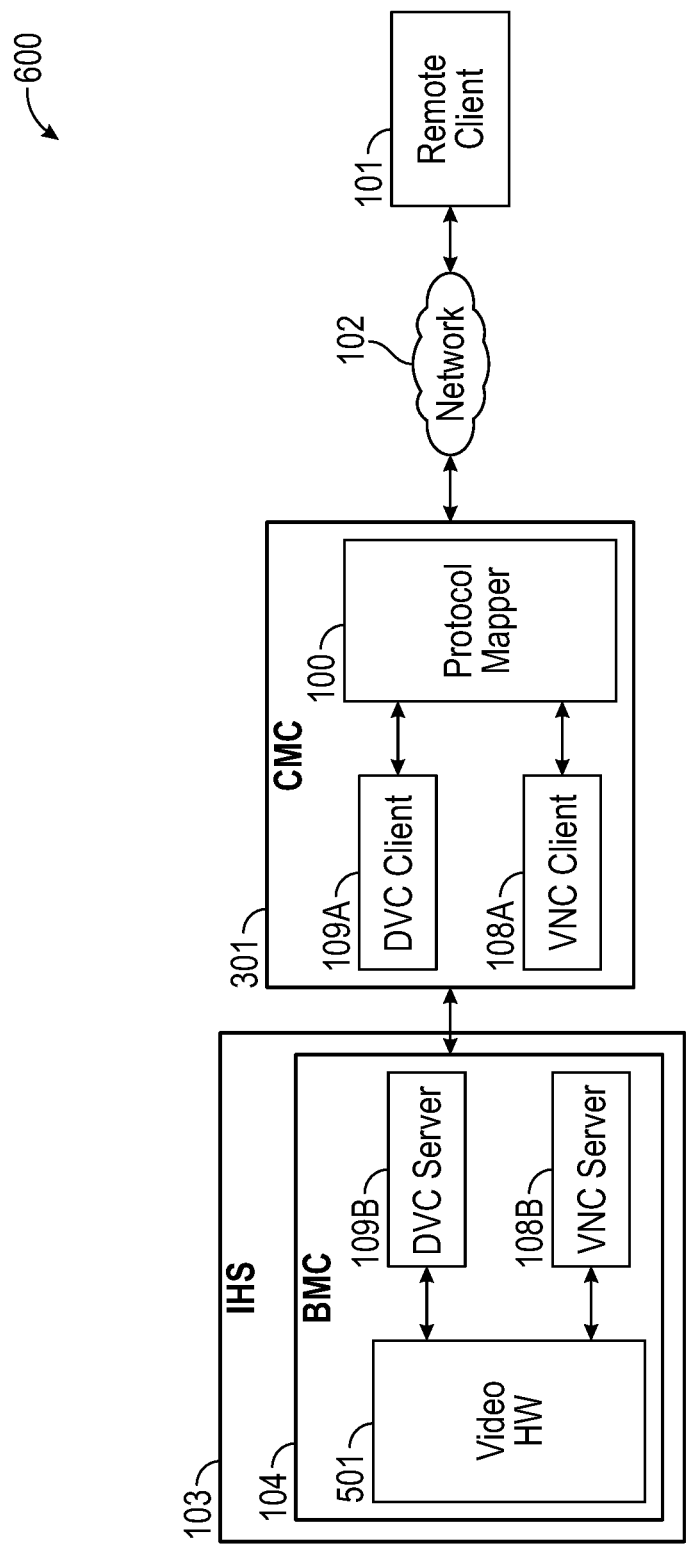
FIG. 6 is a diagram illustrating protocol mapping operations performed by a CMC or enclosure controller, according to some embodiments.

FIG. 6 is a diagram illustrating protocol mapping operations performed by CMC 301 (or an enclosure controller). In some embodiments, upon receiving a video redirection request from client IHS 101 over network 102, protocol mapper 100 of CMC 301 (in a chassis where target IHS 103 resides) selects DVC 109 or VNC 108 components for retrieving video signals from video hardware 501 in BMC 104 of target IHS 103 using a corresponding protocol.

To populate framebuffer 106 with data from video hardware 501, CMC 301 instantiates DVC client 109A and BMC 104 instantiates DVC server 109B. Moreover, CMC 301 instantiates VNC client 108A and BMC 104 instantiates VNC server 108B.

Figure 7:
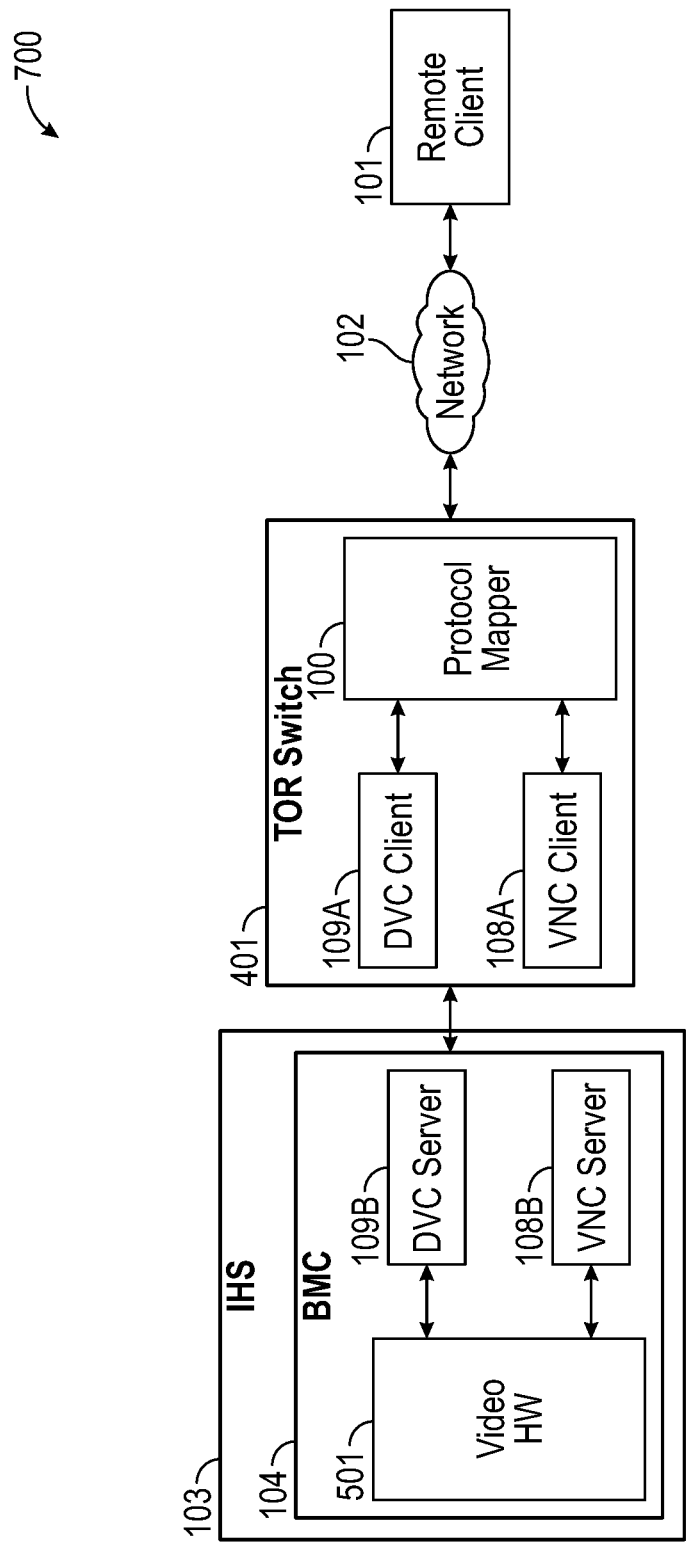
FIG. 7 is a diagram illustrating protocol mapping operations performed by a ToR switch, according to some embodiments.

FIG. 7 is a diagram illustrating protocol mapping operations performed by ToR switch 401. In some embodiments, upon receiving a video redirection request from client IHS 101 over network 102, protocol mapper 100 of ToR switch 401 (in a rack where target IHS 103 resides) selects DVC 109 or VNC 108 components for retrieving video signals from video hardware 501 in BMC 104 of target IHS 103 using a corresponding protocol.

To populate framebuffer 106 with data from video hardware 501, ToR switch 401 instantiates DVC client 109A and BMC 104 instantiates DVC server 109B. ToR switch 401 instantiates VNC client 108A and BMC 104 instantiates VNC server 108B.

In some cases, two or more ToR and/or CMCs may be used, such that two or more instances of protocol mapper 100 may be deployed for the same video redirection session. For example, in some cases, software licensing requirements of a particular video redirection component may allow only a given protocol mapping operation between a BCM and a ToR switch, and a different protocol mapping operation between the ToR switch and a target IHS's BMC, such that two or more distinct mapping operations are performed between target IHS 103 and client IHS 101.

Figure 8:
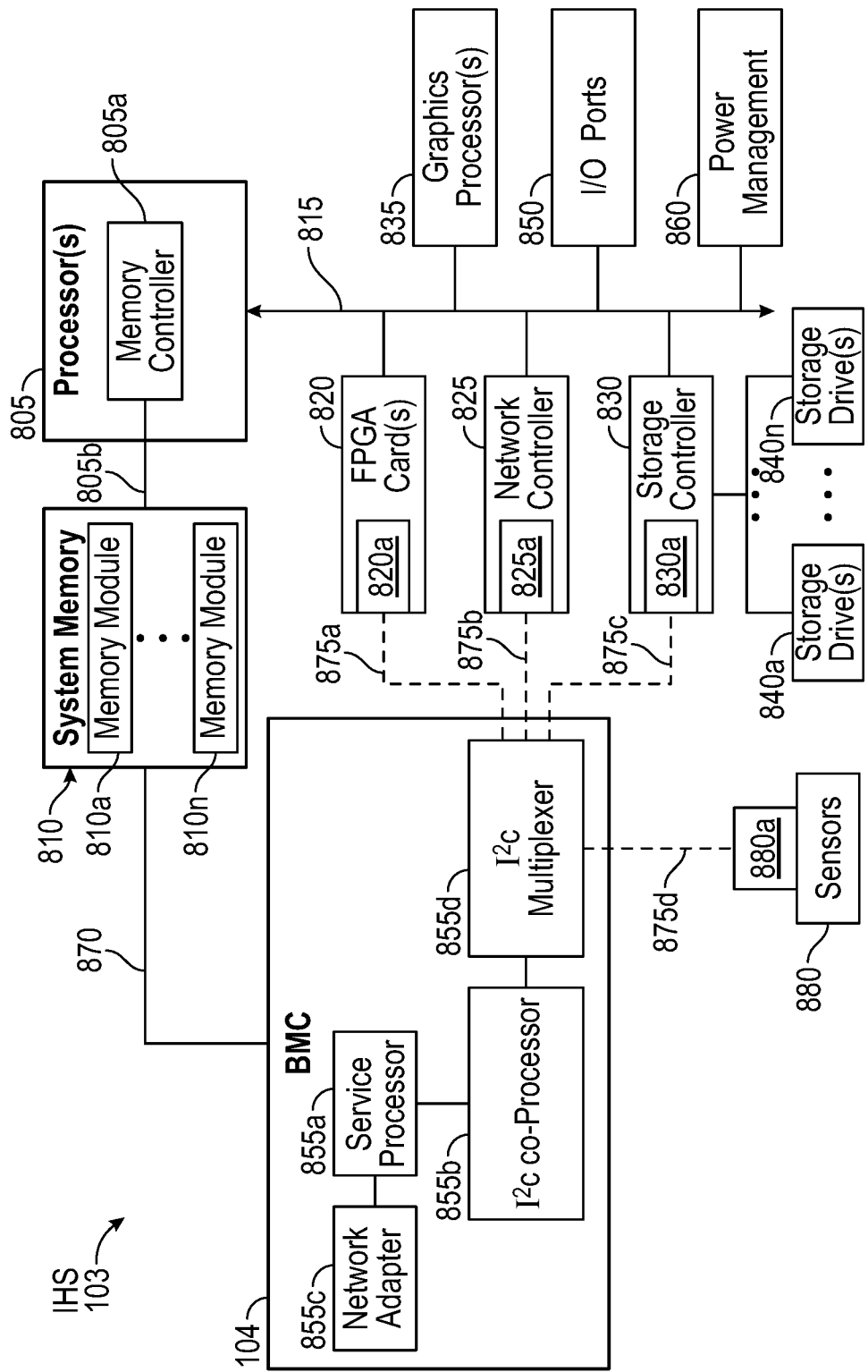
FIG. 8 is a diagram illustrating components of an Information Handling System (IHS), according to some embodiments.
Figure 9:
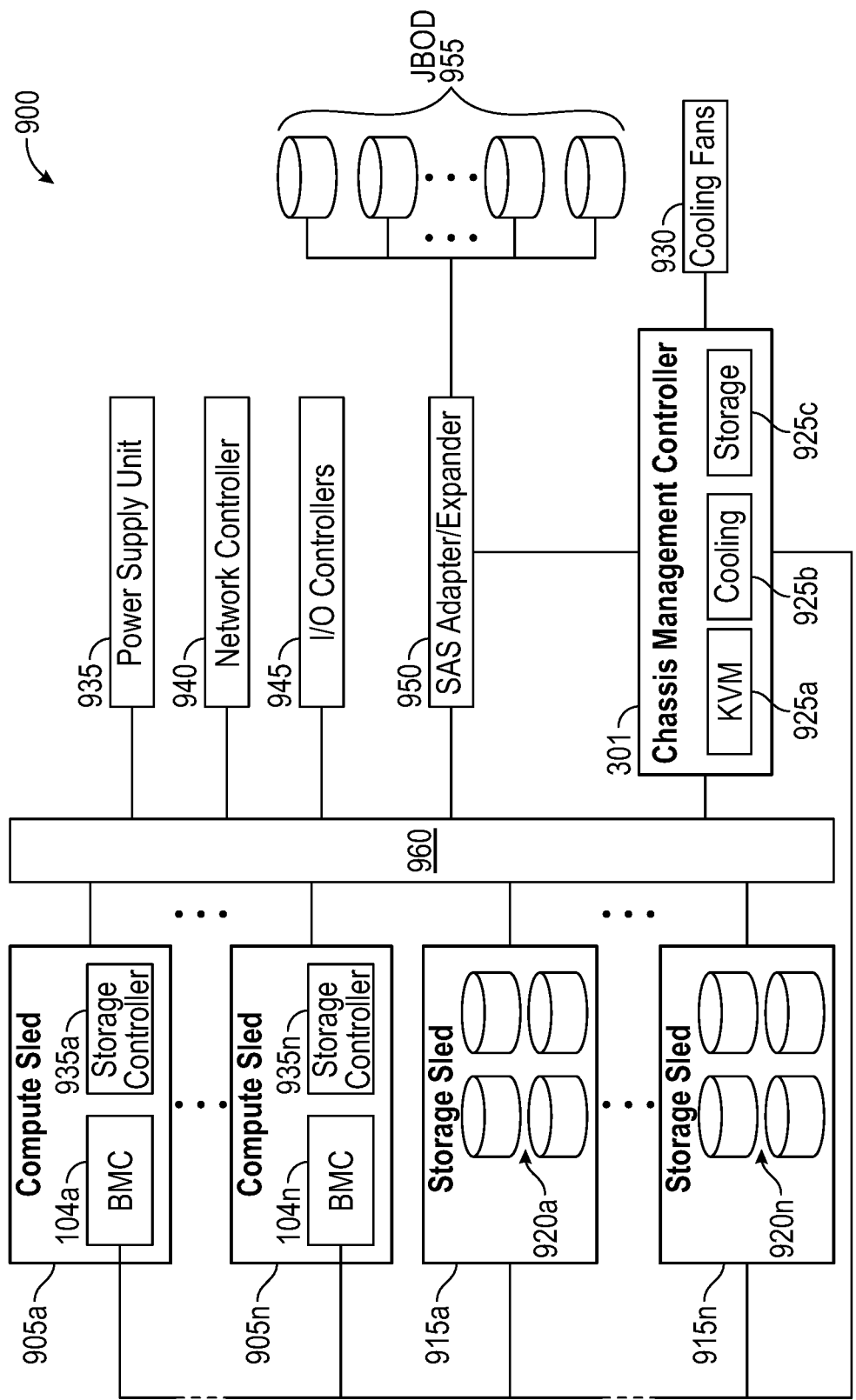
FIG. 9 is a diagram illustrating components of a chassis or rack, according to some embodiments.

FIG. 8 shows an example of an IHS 103 configured to implement systems and methods described herein. In some implementations, IHS 103 may be a computing component, such as a sled or blade, configured to share infrastructure resources provided by a chassis, for example, as shown in FIG. 9 (e.g., 905a-n and/or 915a-n). It should be appreciated, however, that although these embodiments show an IHS as sled or blade, other IHS implementations may be utilized including, but not limited to: desktops, laptops, appliances, and mobile devices, etc.

In some embodiments, processor(s) 805 may include a main processor and a co-processor, each of which may include a plurality of processing cores that, in certain scenarios, may each be used to run an instance of a server. In certain embodiments, one or all of processor(s) 805 may be graphics processing units (GPUs) in scenarios where IHS 103 has been configured to support functions such as multimedia services and graphics applications.

As illustrated, processor(s) 805 includes integrated memory controller 805a that may be implemented directly within the circuitry of processor 805, or memory controller 805a may be a separate integrated circuit that is located on the same die as processor 805. Memory controller 805a may be configured to manage the transfer of data to and from system memory 810 of IHS 103 via high-speed memory interface 805b.

System memory 810 is coupled to processor(s) 805 via memory bus 805b that provides processor(s) 805 with high-speed memory used in the execution of computer program instructions. Accordingly, system memory 810 may include memory components, such as such as static RAM (SRAM), dynamic RAM (DRAM), NAND Flash memory, suitable for supporting high-speed memory operations by the processor(s) 805. In certain embodiments, system memory 810 may combine both persistent, non-volatile memory and volatile memory.

In certain embodiments, system memory 810 may be include multiple removable memory modules. System memory 810 includes removable memory modules 810a-n. Each of removable memory modules 810a-n may correspond to a printed circuit board memory socket that receives corresponding module 810a-n, such as a DIMM (Dual In-line Memory Module), that can be coupled to the socket and then decoupled from the socket as needed, such as to upgrade memory capabilities or to replace faulty components. In other embodiments of IHS, system memory 810 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 103 may utilize a chipset implemented by integrated circuits that are connected to each processor 805. All or portions of the chipset may be implemented directly within the integrated circuitry of an individual processor 805. The chipset may provide the processor(s) 805 with access to a variety of resources accessible via one or more buses 815. Various embodiments may utilize any number of buses to provide the illustrated pathways served by bus 815. In certain embodiments, bus 815 may include a PCIe (PCI Express) switch fabric that is accessed via a PCIe root complex. IHS 103 may also include one or more I/O ports 850, such as PCIe ports, that may be used to couple the IHS 103 directly to other IHSs, storage resources or other peripheral components.

As illustrated, a variety of resources may be coupled to processor(s) 805 of IHS 103 via bus 815. For instance, processor(s) 805 may be coupled to network controller 825, such as provided by a Network Interface Controller (NIC) that is coupled to IHS 103 and allows IHS 103 to communicate via an external network, such as the Internet or a LAN. Processor(s) 805 may also be coupled to power management unit 860 that may interface with (the power system unit of a chassis) in which IHS 103 may be installed as a sled or blade. In certain embodiments, graphics processor 835 may be included within one or more video or graphics cards, or an embedded controller, installed as components of IHS 103. In certain embodiments, graphics processor 835 may be an integrated part of the Baseband Management Controller (BMC) 104 and may be utilized to support the display of diagnostic and administrative interfaces related to IHS 103 via display devices that are coupled, either directly or remotely, to BMC 104.

As illustrated, IHS 103 may include one or more FPGA (Field-Programmable Gate Array) card(s) 820. Each of FPGA card(s) 820 supported by IHS 103 may include various processing and memory resources, in addition to an FPGA integrated circuit that may be reconfigured after deployment of IHS 103 through programming functions supported by the FPGA card 820. Each individual FGPA card 820 may be optimized to perform specific processing tasks, such as specific signal processing, security, data mining, and artificial intelligence functions, and/or to support specific hardware coupled to IHS 103.

In certain embodiments, IHS 103 may operate using a Basic Input/Output System (BIOS) that may be stored in a non-volatile memory accessible by processor(s) 805. The BIOS may provide an abstraction layer by which the operating system (OS) of the IHS 103 interfaces with its hardware components. Upon powering or restarting IHS 103, processor(s) 805 may utilize BIOS instructions to initialize and test hardware components, including both components permanently installed as components of the motherboard of IHS 103 and removable components installed within various expansion slots supported by the IHS 103. The BIOS instructions may also load an OS. In certain embodiments, IHS 103 may utilize Unified Extensible Firmware Interface (UEFI) in addition to or instead of a BIOS. In certain embodiments, the functions provided by a BIOS may be implemented, in full or in part, by BMC 104.

In certain embodiments, BMC 104 may operate from a different power plane from processor(s) 805 and other components of IHS 103, thus allowing BMC 104 to operate, and management tasks to proceed, while the processing cores of IHS 103 are powered off. As described, various functions provided by the BIOS, including launching the OS of IHS 103, may be implemented by BMC 104. In some embodiments, BMC 104 may perform various functions to verify the integrity of IHS 103 and its hardware components prior to initialization (e.g., in a bare-metal state).

BMC 104 may include service processor 855a, or specialized microcontroller, that operates management software that supports remote monitoring and administration of IHS 103. BMC 104 may be installed on the motherboard of IHS 103 or may be coupled to IHS 103 via an expansion slot provided by the motherboard. In support of remote monitoring functions, network adapter 855c may support connections with BMC 104 using wired and/or wireless network connections via a variety of network technologies.

As a non-limiting example of a BMC, the integrated Dell BMC (iDRAC) from Dell® is embedded within Dell PowerEdge™ servers and provides functionality that helps information technology (IT) administrators deploy, update, monitor, and maintain servers remotely.

In some embodiments, BMC 104 may support monitoring and administration of various managed devices 820, 825, 830, 880 of an IHS via a sideband bus interface. For instance, messages utilized in device management may be transmitted using I2C sideband bus connections 875a-d that may be individually established with each of the respective managed devices 820, 825, 830, 880 through the operation of I2C multiplexer 855d of BMC 104. As illustrated, certain of the managed devices of IHS 103, such as FPGA cards 820, network controller 825 and storage controller 830, are coupled to the IHS processor(s) 805 via in-line bus 815, such as a PCIe root complex, that is separate from the I2C sideband bus connections 875a-d used for device management. The management functions of BMC 104 may utilize information collected by various managed sensors 880 located within the IHS. For instance, temperature data collected by sensors 880 may be utilized by BMC 104 in support of closed-loop airflow cooling of the IHS 103.

In certain embodiments, the service processor 855a of BMC 104 may rely on an I2C co-processor 855b to implement sideband I2C communications between BMC 104 and managed components 820, 825, 830, 880 of the IHS. The I2C co-processor 855b may be a specialized co-processor or micro-controller that is configured to interface via a sideband I2C bus interface with the managed hardware components 820, 825, 830, 880 of IHS. In some embodiments, the I2C co-processor 855b may be an integrated component of the service processor 855a, such as a peripheral system-on-chip feature that may be provided by the service processor 855a.

Each I2C bus 875a-d is illustrated as single line in FIG. 8. However, in various implementations, each I2C bus 875a-d may include of a clock line and data line that couple BMC 104 to I2C endpoints 820a, 825a, 830a, 880a which may be identified as modular field replaceable units (FRUs).

In various scenarios, a portion of the managed devices 820, 825, 830, 880 may support I2C bus 875a-d communications that utilize IPMI (Management Component Transport Protocol) messaging. For instance, certain types of legacy and less-sophisticated managed devices, such as temperature sensors 880, may utilize IPMI messaging and may thus be identified on the I2C bus 875d as an IPMI endpoints by the I2C coprocessor 855b. An IHS 103 may include a variety of IPMI sensors 880 that collect various types of readings, such as intrusion detection and power consumption.

In providing sideband management capabilities, the I2C co-processor 855b may each interoperate with corresponding endpoint I2C controllers 820a, 825a, 830a, 880a that implement the I2C communications of the respective managed devices 820, 825, 830. The endpoint I2C controllers 820a, 825a, 830a, 880a may be implemented as a dedicated microcontroller for communicating sideband I2C messages with BMC 104, or endpoint I2C controllers 820a, 825a, 830a, 880a may be integrated SoC functions of a processor of the respective managed device endpoints 820, 825, 830, 880.

In various embodiments, IHS 103 does not include each of the components shown in FIG. 8. In various embodiments, IHS 103 may include various additional components in addition to those that are shown in FIG. 8. Furthermore, some components that are represented as separate components in FIG. 8 may in certain embodiments instead be integrated with other components. For example, in certain embodiments, all or a portion of the functionality provided by the illustrated components may instead be provided by components integrated into one or more processor(s) 805 as a systems-on-a-chip (SoC).

IHS 103 of FIG. 8 may be a compute sled, such as compute sleds 905a-n of FIG. 9 below, that may be installed within a chassis, that may in turn be installed within a rack. Installed in this manner, IHS 103 may utilized shared power, network and cooling resources provided by the chassis and/or rack.

FIG. 9 is a diagram illustrating components of a chassis or rack 900 comprising one or more compute sleds 905a-n and one or more storage sleds 915a-n that may be configured to implement the systems and methods described herein. Chassis 900 may include one or more bays that each receive an individual sled (that may be additionally or alternatively referred to as a tray, blade, and/or node), such as compute sleds 905a-n and storage sleds 915a-n. Chassis 900 may support a variety of different numbers (e.g., 4, 8, 16, 32), sizes (e.g., single-width, double-width) and physical configurations of bays.

Other embodiments may include additional types of sleds that provide various types of storage and/or processing capabilities. Other types of sleds may provide power management and networking functions. Sleds may be individually installed and removed from the chassis 900, thus allowing the computing and storage capabilities of a chassis to be reconfigured by swapping the sleds with different types of sleds, in many cases without affecting the operations of the other sleds installed in chassis 900.

Multiple chassis 900 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by compute sleds 905a-n and storage sleds 915a-n, thus providing efficiency improvements and supporting greater computational loads.

Chassis 900 may be installed within a rack structure that provides all or part of the cooling utilized by chassis 900. For airflow cooling, a rack may include one or more banks of cooling fans that may be operated to ventilate heated air from within the chassis 900 that is housed within the rack. Chassis 900 may alternatively or additionally include one or more cooling fans 930 that may be similarly operated to ventilate heated air from within the sleds 905a-n, 915a-n installed within chassis. A rack and chassis 900 installed within the rack may utilize various configurations and combinations of cooling fans to cool the sleds 905a-n, 915a-n and other components housed within chassis 900.

The sleds 905a-n, 915a-n may be individually coupled to chassis 900 via connectors that correspond to the bays provided by chassis 900 and that physically and electrically couple an individual sled to backplane 960.

Chassis backplane 960 may be a printed circuit board that includes electrical traces and connectors that are configured to route signals between the various components of chassis 900 that are connected to backplane 960. In various embodiments, backplane 960 may include various additional components, such as cables, wires, midplanes, backplanes, connectors, expansion slots, and multiplexers. In certain embodiments, backplane 960 may be a motherboard that includes various electronic components installed thereon. Such components installed on motherboard backplane 960 may include components that implement all or part of the functions described with regard to SAS (Serial Attached SCSI) expander 950, I/O controllers 945, network controller 940, and power supply unit 935.

In certain embodiments, compute sleds 905a-n may be IHSs such as described with regard to IHS 103 of FIG. 8. A compute sled 905a-n may provide computational processing resources that may be used to support a variety of e-commerce, multimedia, business and scientific computing applications, such as services provided via a cloud implementation. Compute sleds 905a-n are typically configured with hardware and software that provide leading-edge computational capabilities. Accordingly, services provided using such computing capabilities are typically provided as high-availability systems that operate with minimum downtime. As described in additional detail with regard to FIG. 8, compute sleds 905a-n may be configured for general-purpose computing or may be optimized for specific computing tasks.

As illustrated, each compute sled 905a-n includes a respective BMC 910a-n. As described in additional detail with regard to FIG. 8, each BMC 910a-n provides capabilities for remote monitoring and management of its respective compute sled 905a-n. In support of these monitoring and management functions, BMCs 910a-n may utilize both in-band and sideband (i.e., out-of-band) communications with various components of a compute sled 905a-n and chassis 900. BMC 910a-n may collect sensor data, such as temperature sensor readings, from components of the chassis 900 in support of airflow cooling of the chassis 900 and the sleds 905a-n, 915a-n. In addition, each BMC 910a-n may implement various monitoring and administrative functions related to compute sleds 905a-n that require sideband bus connections with various internal components of the respective compute sleds 905a-n.

As described in above, BMCs 910a-n may provide capabilities support remote monitoring and managing of IHSs, such as compute sleds 905a-n.

As illustrated, chassis 900 also includes one or more storage sleds 915a-n that are coupled to the backplane 960 and installed within one or more bays of chassis 900 in a similar manner to compute sleds 905a-n. Each of the individual storage sleds 915a-n may include various different numbers and types of storage devices. For instance, storage sleds 915a-n may include SAS (Serial Attached SCSI) magnetic disk drives, SATA (Serial Advanced Technology Attachment) magnetic disk drives, solid-state drives (SSDs) and other types of storage drives in various combinations. Storage sleds 915a-n may be utilized in various storage configurations by compute sleds 905a-n that are coupled to chassis 900.

Each of compute sleds 905a-n includes storage controller 935a-n that may be utilized to access storage drives that are accessible via chassis 900. Some of the individual storage controllers 935a-n may provide support for RAID (Redundant Array of Independent Disks) configurations of logical and physical storage drives, such as storage drives provided by storage sleds 915a-n. In some embodiments, some or all of individual storage controllers 935a-n may be HBAs (Host Bus Adapters) that provide more limited capabilities in accessing physical storage drives provided via storage sleds 915a-n and/or via SAS expander 950.

In addition to the data storage capabilities provided by storage sleds 915a-n, chassis 900 may provide access to other storage resources that may be installed components of chassis 900 and/or may be installed elsewhere within a rack housing the chassis 900, such as within a storage blade. In certain scenarios, such storage resources 955 may be accessed via a SAS expander 950 that is coupled to backplane 960 of the chassis 900.

SAS expander 950 may support connections to a number of JBOD (Just a Bunch Of Disks) storage drives 955 that may be configured and managed individually and without implementing data redundancy across the various drives 955. Additional storage resources 955 may also be at various other locations within a datacenter in which chassis 900 is installed. Such additional storage resources 955 may also may be remotely located.

As illustrated, the chassis 900 of FIG. 9 includes a network controller 940 that provides network access to the sleds 905a-n, 915a-n installed within the chassis. Network controller 940 may include various switches, adapters, controllers and couplings used to connect chassis 900 to a network, either directly or via additional networking components and connections provided via a rack in which chassis 900 is installed.

Chassis 900 may similarly include power supply unit 935 that provides the components of the chassis with various levels of DC power from an AC power source or from power delivered via a power system provided by a rack within which chassis 900 may be installed. In certain embodiments, power supply unit 935 may be implemented within a sled that may provide chassis 900 with redundant, hot-swappable power supply units.

Chassis 900 may also include various I/O controllers 940 that may support various I/O ports, such as USB ports that may be used to support keyboard and mouse inputs and/or video display capabilities. Such I/O controllers 945 may be utilized by CMC 301 to support various KVM (Keyboard, Video and Mouse) 925a capabilities that provide administrators with the ability to interface with the chassis 900 and or its individual blades. CMC 301 may also include storage module 925c that provides capabilities for managing and configuring certain aspects of the storage devices of chassis 900, such as the storage devices provided within storage sleds 915a-n and within the JBOD 955.

In addition to providing support for KVM 925a capabilities for administering chassis 900, CMC 301 may support various additional functions for sharing the infrastructure resources of chassis 900. In some scenarios, CMC 301 may implement tools for managing power 935, network bandwidth 940 and airflow cooling 930 that are available via the chassis 900. As described, the airflow cooling 930 utilized by chassis 900 may include an airflow cooling system that is provided by a rack in which the chassis 900 may be installed and managed by a cooling module 925b of CMC 301.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a Baseband Management Controller (BMC) providing Keyboard, Video and Mouse (KVM) capabilities for operating a plurality of target IHSs managed by the BMC, wherein a first target IHS supports KVM redirection according to a first KVM protocol and a second target IHS supports KVM redirection according to a second KVM protocol; and
   a memory coupled to the BMC, the memory having program instructions stored thereon that, upon execution by the BMC, cause the BMC to:
      receive a request from a remote client for KVM redirection of the first target IHS or the second target IHS;
      select one of a plurality of redirection components available to the IHS to populate a framebuffer with video frames received from the first target IHS according to the first KVM protocol or video frames received from the second target IHS according to the second KVM protocol;
      retrieve the video frames from the framebuffer; and
      transmit a response to the remote client according to a third KVM protocol, wherein the response comprises the video frames.

2. The IHS of claim 1, wherein the request comprises a request for access to (i) a display output and (ii) a Human Interface Device (HID) of the first target IHS or of the second target IHS.

3. The IHS of claim 1, wherein the HID comprises at least one of: a keyboard or a mouse.

4. The IHS of claim 1, wherein the first and second protocols are selected from the group consisting of: Remote Desktop Protocol (RDP), Virtual Network Computing (VNC), Dynamic Virtual Channel (DVC), Serial-Over-Local-Area-Network (SOL), and virtual Keyboard Video and Mouse (vKVM).

5. The IHS of claim 1, wherein the framebuffer comprises a circular framebuffer with pre-captured video frames, and wherein the video frames in the response are captured prior to the request being received.

6. The IHS of claim 1, wherein prior to selecting the redirection component, the program instructions, upon execution by the BMC, cause the BMC to inventory each redirection component available to the IHS.

7. The IHS of claim 6, wherein to inventory each redirection component, the program instructions, upon execution by the BMC, further cause the BMC to check a status of a software license of each redirection component.

8. The IHS of claim 6, wherein to inventory each redirection component, the program instructions, upon execution by the BMC, further cause the BMC to collect information about a frame rate of a video stream provided by each redirection component.

9. The IHS of claim 6, wherein the request further comprises a maximum or minimum bandwidth requirement, and wherein to select the redirection component, the program instructions, upon execution by the BMC, further cause the BMC to select a redirection component meeting the bandwidth requirement.

10. The IHS of claim 6, wherein the request further comprises a maximum or minimum pixel resolution requirement, and wherein to select the redirection component, the program instructions, upon execution by the BMC, further cause the BMC to select a redirection component meeting the resolution requirement.

11. A hardware memory of an Information Handling System (IHS), the hardware memory having program instructions stored thereon that, upon execution by a Chassis Management Controller (CMC), cause the CMC to:
   receive a request from a remote client for Keyboard, Video and Mouse (KVM) redirection for a selected one of a plurality of IHS blades managed by the CMC, wherein a first IHS blade supports KVM redirection according to a first KVM protocol and a second IHS blade supports KVM redirection according to a second KVM protocol;
   select one of a plurality of redirection components available to the selected IHS blade to populate a framebuffer with video frames received from the first IHS blade according to the first KVM protocol or video frames received from the second IHS blade according to the second KVM protocol;
   retrieve the video frames from the framebuffer; and
   transmit a response to the remote client according to a third KVM, wherein the response comprises the video frames.

12. The hardware memory of claim 11, wherein the request comprises a request for access to a display desktop of the selected first IHS blade or the selected second IHS blade.

13. The hardware memory of claim 11, wherein the first and second protocols are selected from the group consisting of: Remote Desktop Protocol (RDP), Virtual Network Computing (VNC), Dynamic Virtual Channel (DVC), Serial-Over-Local-Area-Network (SOL), and virtual Keyboard Video and Mouse (vKVM).

14. The hardware memory of claim 11, wherein prior to selecting the redirection component, the program instructions, upon execution by the CMC, cause the CMC to inventory each redirection component available to the selected IHS blade by verifying the validity or suitability of at least one of: a status of a software license, a pixel resolution, or a frame rate provided by each redirection component.

15. The hardware memory of claim 11, wherein the framebuffer is a circular framebuffer with pre-captured video frames, and wherein the video frames in the response are captured prior to the request being received.

16. The hardware memory of claim 15, wherein the request further comprises a bandwidth and a pixel resolution requirement, and wherein to select the redirection component, the program instructions, upon execution by the CMC, further cause the CMC to select a redirection component meeting the bandwidth and the pixel resolution requirements.

17. A method, comprising:
receiving a request from a remote client for Keyboard, Video and Mouse (KVM) redirection for a selected one of a plurality of IHS blades managed by a Top-of-Rack (ToR) switch, wherein a first IHS blade supports KVM redirection according to a first KVM protocol and a second IHS blade supports KVM redirection according to a second KVM protocol;
selecting, by the ToR switch, one of a plurality of redirection components available to the selected IHS blade to populate a framebuffer with video frames received from the first IHS blade according to the first KVM protocol or video frames received from the second IHS blade according to the second KVM protocol;
retrieving, by the ToR switch, the video frames from the framebuffer; and
transmitting, by the ToR switch, a response to the remote client according to a third KVM, wherein the response comprises the video frames.

18. The method of claim 17, wherein the first and second protocols are selected from the group consisting of: Remote Desktop Protocol (RDP), Virtual Network Computing (VNC), Dynamic Virtual Channel (DVC), Serial-Over-Local-Area-Network (SOL), and virtual Keyboard Video and Mouse (vKVM).

19. The method of claim 17, wherein prior to selecting the redirection component, the method further comprises inventorying each redirection component available to the selected IHS blade, and wherein inventorying each redirection component further comprises validating, by the ToR switch, a software license provided by at least one of the redirection components.

20. The method of claim 17, wherein the framebuffer is a circular framebuffer with pre-captured video frames, and wherein the video frames in the response are captured prior to the request being received.

* * * * *